United States Patent [19]

Tongu

[11] Patent Number: 4,791,790
[45] Date of Patent: Dec. 20, 1988

[54] AIR-COOLED ABSORPTION-TYPE WATER COOLING AND HEATING APPARATUS

[75] Inventor: Shinji Tongu, Shizuoka, Japan
[73] Assignee: Yazaki Corporation, Tokyo, Japan
[21] Appl. No.: 137,675
[22] Filed: Dec. 24, 1987
[51] Int. Cl.$^4$ ............................................. F25B 15/00
[52] U.S. Cl. ..................................................... 62/476

[56] References Cited

U.S. PATENT DOCUMENTS

| 3,527,060 | 9/1970 | Kruggel | 62/476 X |
| 4,691,528 | 9/1987 | Tongu | 62/238.3 |
| 4,748,830 | 6/1988 | Oouchi et al. | 62/476 |

Primary Examiner—Lloyd L. King
Attorney, Agent, or Firm—Robbins & Laramie

[57] ABSTRACT

Disclosed is an air-cooled absorption-type water cooling and heating apparatus, wherein, during a heating operation, the absorption heat generated when a condensed solution absorbs refrigerant vapor is imparted to circulated cold or hot water flowing through a first cold/hot water heat exchanger so as to convert the water into hot water, and condensation heat necessary for condensation of refrigerant vapor by a water heating device is supplied to circulated cold or hot water flowing through a second cold/hot water heat exchanger so as to convert said water into hot water for heating. At this time, since the refrigerant solution evaporates on an inner wall surface of a cylinder by absorbing the heat of the air, the heat obtained from the air is added to the heat obtained from the high-temperature regenerator, with the result that a heat pump effect can be obtained.

6 Claims, 3 Drawing Sheets

AIR-COOLED ABSORPTION-TYPE WATER COOLING AND HEATING APPARATUS

BACKGROUND OF THE INVENTION

1. Field of the Invention

The present invention relates to an air-cooled absorption-type water cooling and heating apparatus, and more particularly to an air-cooled absorption-type water cooling and heating apparatus which has an improved coefficient of performance during cooling and heating operations.

2. Description of the Related Art

In a conventional air-cooled absorption-type water cooling and heating apparatus of this type, a high-temperature regenerator is provided with a heating source and communicates with a separator via pipes. The separator is provided with a solution feeding pipe and a vapor pipe having a first on-off valve. The evaporator pipe communicates through a low-temperature regenerator with a forcedly air-cooled condenser by means of a pipe. In addition, the lower-temperature regenerator and the forcedly air-cooled condenser communicate with each other by means of a vapor pipe. The forcedly air-cooled condenser is adapted to be forcedly air-cooled by a cooling fan. The forcedly air-cooled condenser communicates with an evaporator section via a pipe. The evaporator section comprises a first spraying mechanism which receives a refrigerant sent through said pipe and sprays the same onto the surface of a cold-water heat exchanger, as well as a surface section of a cold-water heat exchanger which constitutes an evaporator.

The aforementioned solution feeding pipe is connected to a high-temeprature heat exchanger. An outlet side pipe of the high-temperature heat exchanger is provided with a second on-off valve, and this pipe is connected to the low-temperature regenerator. A condensed solution pipe provided at a bottom of the low-temperature regenerator is connected to a low-temperaure heat exchanger, which is in turn connected to an absorber section via a pipe. The absorber section comprises a cylinder formed coaxially around an outer periphery of the cold-water heat exchanger with a fixed space provided therebetween; fins formed around the outer periphery of the cylinder; a second spraying mechanism which receives a condensed solution sent through the pipe and is adapted to spray the same onto an inner peripheral wall of the cylinder; an inner wall surface of the cylinder constituting an absorber which has the function of absorbing the refrigerant; and a solution tank. This absorber section cools absorption heat generated by absorption action in the absorber, by forcedly supplying air from the air-cooling fan to the fins.

One end of a return pipe is connected to a lower portion of the absorber section, and the other end of this return pipe is connected to the high-temperature regenerator via a circulation pump, the low-temperature heat exchanger, and the high-temperature heat exchanger. The delivery side of a cold-water and hot-water pump is connected to the cold-water heat exchanger and a hot-water heat exchanger provided i the separator. Meanwhile, the suction side of the cold-water and hot-water pump is connected an an air-conditioning load. In addition, the cold-water heat exchanger and the hot-water heat exchanger are connected to a three-way valve, the other end of which is connected to the air-conditioning load.

However, in such a conventional air-cooled absorption-type water cooling and heating apparatus, a coefficient of performance (C. O. P.) during a cooling operation is 1.0 to 1.1, whereas the coefficient of performance (C. O. P.) during a heating operation is 0.8 to 0.85, which is the heating efficiency of the high-temperature regenerator. Here, the coefficient of performance is given by the following formula:

$$C.\ O.\ P. = \frac{\text{Cooling or heating capability}}{\text{Quantity of heat of high-temperature regenerator}}$$

In addition, since the thermal efficiency is low during a heating operation as compared with a cooling operation, there has been a problem in that the thermal efficiency is undesirably low during the heating operation; hence, such a conventional air-cooled absorption-type water cooling and heating apparatus is not economic. In terms of a general air-conditioning load experienced in a country like Japan, the heating load is about 1.2 times greater than the cooling load, so that, as countermeasures, auxiliary burning is effected by using an additional heating source, and the amount of heating by the high-temperature regenerator is increased. Consequently, there have been problems in that the equipment cost increases, and the control of the apparatus becomes complicated.

SUMMARY OF THE INVENTION

Accordingly, an object of the present invention is to provide an air-cooled absorption type water cooling and heating apparatus which has an improved coefficient of performance during both cooling and heating operations.

To this end, in accordance with the present invention, there is provided an air-cooled absorption-type water cooling and heating apparatus, comprising: a high-temperature regenerator having a heating source for heating a dilute solution; a separator for separating the dilute solution heated by the high-temperature regenerator into refrigerant vapor and an intermediate-concentration solution; a high-temperature heat exchanger for subjecting the intermediate-concentration solution to heat exchange with the dilute solution flowing into the high-temperature exchanger; first change-over means adapted to introduce the refrigerant vapor introduced from the separator into a low-temperature regenerator during cooling and into a water heating device during heating; second change-over means adapted to introduce the intermediate-concentration solution from the high-temperature heat exchanger into the low-temperature regenerator to generate a condensed solution during cooling and into a first spraying mechanism during heating; a condenser for condensing the refrigerant vapor from the low-temperature regenerator into a liquid refrigerant during cooling so as to be supplied to the first spraying mechanism; a low-temperature heat exchanger by which a condensed solution flowing in from the low-temperature regenerator is subjected to heat exchange with the dilute solution entering the high-temperature heat exchanger so as to be cooled; a second spraying mechanism which receives the supply of the condensed solution from the low-temperature heat exchanger during cooling and receives the supply of the liquid refrigerant from the water heating device during heating; a first cold/hot water heat exchanger through which cold or hot water is allowed to flow, externally surrounding means being disposed around an outer periphery of the first cold/hot water heat exchanger with a fixed interval therebetween; and a second cold/hot water heat exchanger through which the cold or hot water is allowed to flow, wherein the first spraying mechanism is adapted to spray the condensed solution or the liquid refrigerant onto an outer surface of the first cold/hot water heat exchanger, the second spraying means is adapted to be capable of spraying the condensed solution or the liquid refrigerant onto an inner surface of the externally surrounding means so as to obtain a dilute solution, an outer surface of the externally surrounding means is capable of being air-cooled, and a circulation pump is provided to pressure-feed the dilute solution to the low-temperature heat exchanger.

Furthermore, according to another aspect of the invention, in addition to the above-described features an arrangement is provided such that the dilute solution is introduced so that the temperature of the refrigerant does not drop below a predetermined level when the first or second spraying mechanism is operating as an evaporator.

DETAILED DESCRIPTION OF THE INVENTION

Figure 3:
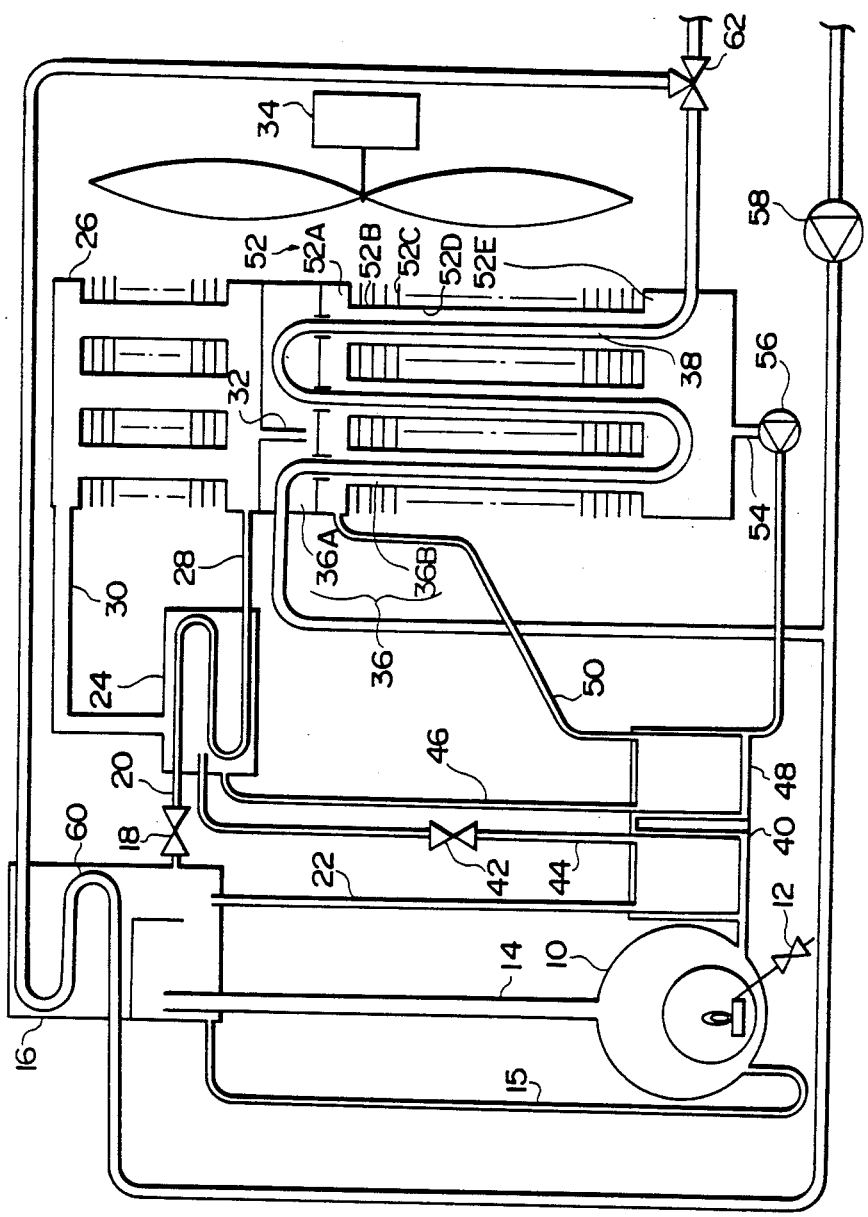
FIG. 3 is a diagram schematically illustrating a conventional air-cooled absorption refrigerating machine.

A conventional air-cooled absorption-type water cooling and heating apparatus of this type is constructed as shown in FIG. 3. In other words, a high-temperature regenerator 10 is provided with a heating source 12 and communicates with a separator 16 via pipes 14, 15. The separator 16 is provided with a solution feeding pipe 22 and a vapor pipe 20 having a first on-off valve 18. The evaporator pipe 20 communicates through a low-temperature regenerator 24 with a forcedly air-cooled condenser 26 by means of a pipe 28. In addition, the lower-temperature regenerator 24 and the forcedly air-cooled condenser 26 communicate with each other by means of a vapor pipe 30. The forcedly air-cooled condenser 26 is adapted to be forcedly air-cooled by a cooling fan 34. The forcedly air-cooled condenser 26 communicates with an evaporator section 36 via a pipe 32. The evaporator section 36 comprises a first spraying mechanism 36A which receives a refrigerant sent through the pipe 32 and sprays the same onto the surface of a cold-water heat exchanger 38, as well as a surface section 36B of a cold-water heat exchanger 38 which constitutes a evaporator.

The aforementioned solution feeding pipe 22 is connected to a high-temeprature heat exchanger 40. An outlet side pipe 44 of the high-temperature heat exchanger 40 is provided with a second on-off valve 42, and this pipe 44 is connected to the low-temperature regenerator 24. A condensed solution pipe 46 provided at a bottom of the low-temperature regenerator 24 is connected to a low-temperaure heat exchanger 48, which is in turn connected to an absorber section 52 via a pipe 50. The absorber section 52 comprises a cylinder 52B formed coaxially around an outer periphery of the cold-water heat exchanger 38 with a fixed space provided therebetween; fins 52C formed around the outer periphery of the cylinder 52B; a second spraying mechanism 52A which receives a condensed solution sent through the pipe 50 and is adapted to spray the same onto an inner peripheral wall of the cylinder 52B; an inner wall surface 52D of the cylinder 52B constituting an absorber which has the function of absorbing the refrigerant; and a solution tank 52E. This absorber section 52 cools absorption heat generated by absorption action in the absorber 52D, by forcedly supplying air from the air-cooling fan 34 to the fins 52C.

On end of a return pipe 54 is connected to a lower portion of the absorber section 52, and the other end of this return pipe 54 is connected to the high-temperature regenerator 10 via a circulation pump 56, the low-temperature heat exchanger 48, and the high-temperature heat exchanger 40. The delivery side of a cold-water and hot-water pump 58 is connected to the cold-water heat exchanger 38 and a hot-water heat exchanger 60 provided in the separator 16. Meanwhile, the suction side of the cold-water and hot-water pump 58 is connected an an air-conditioning load. In addition, the cold-water heat exchanger 38 and the hot-water heat exchanger 60 are connected to a three-way valve 62, the other end of which is connected to the air-conditioning load.

The operation of the above-described air-cooled absorption-type cold/hot water apparatus is as follows:
<Cooling Operation>

The first and second on-off valves 18, 42 are opened.

The three-way valve 62 is changed over to the cold-water heat exchanger 38 side, and the air-cooling fan 34 is operated.

A dilute solution in the high-temperature regenerator 10 is heated by the heating source 12, and enters the separator 16 in a high-temperature state.

The separator 16 separates the high-temperature dilute solution into refrigerant vapor and an intermediate-concentration solution. The separator then sends the refrigerant vapor to the low-temperature regenerator 24 by means of the vapor pipe 20, and sends the intermediate-concentration solution to the high-temperature heat exchanger 40 via the solution feeding pipe 22. The intermediate-concentration solution which has entered the high-temperature heat exchanger 40 is subjected to heat exchange with the dilute solution which is sent to the high-temperature regenerator 10, so as to warm the dilute solution. The intermediate-concentration solution then enters the low-temperature regenerator 24 through the outlet-side pipe 44.

The refrigerant vapor which entered the low-temperature regenerator 24 from the vapor pipe 20 heats the intermediate-concentration solution supplied from the high-temperature heat exchanger 40, and is then led to the air-cooled condenser 26. In addition, the intermediate-concentration solution in the low-temperature regenerator 24, when heated, is separated into a condensed solution and refrigerant vapor. The refrigerant vapor is led to the air-cooled condenser 26 via the vapor pipe 30, while the condensed solution is led to the low-temperature heat exchanger 48 through the condensed solution pipe 46.

The refrigerant vapor which has entered the air-cooled condenser 26 is forcedly air-cooled by the air-cooling fan 34 and is turned into a liquid refrigerant. This liquid refrigerant is temporarily received by the first spraying mechanism 36A of the evaporator section 36 held under low pressure and is then sprayed onto the surface of the cold-water heat exchanger 38 by the first spraying mechanism. The liquid refrigerant sprayed inside the evaporator (the outer peripheral surface 36B of the cold-water heat exchanger 38) of the evaporator section 36 evaporates while cooling the cold water flowing through the cold-water heat exchanger 38, and is then absorbed by the condensed solution sprayed onto the absorber (52D) of the absorber section 52. Meanwhile, the condensed solution led to the low-temperature heat exchanger 48 from the low-temperature regenerator 24 is cooled by being subjected to heat exchange with the dilute solution pressure fed from the circulation pump 56 to the low-temperature heat exchanger 48, and is then supplied to the second spraying mechanism 52A of the absorber section 52. The condensed solution sprayed to the inside of the absorber (52D) of this absorber section 52 is forcedly air-cooled as the air is blown to the fins 52C by the air-coling fan 34. At the same time, this condensed solution absorbs the refrigerant vapor flowing in from the evaporator 36B and is thereby turned into a dilute solution, and remains in the solution tank 52E. The dilute solution in this solution tank 52E is sucked by the circulation pump 56 via the return pipe 54, and is then sent again to the high-temperature regenerator 10 via the low-temperature heat exchanger 48 and the high-temperature heat exchanger 40.

<Heating Operation>

During a heating operation, the first and second on-off valves 18, 42 are closed, and the three-way valve 62 is changed over to the hot-water heat exchanger 60 side. At the same time, the operation of the air-cooling fan 34 is stopped. As a result, a hot-water pipeline forms a closed circuit comprising a heating load, the cold/hot water pump 58, the hot-water heat exchanger 60, the three-way valve 62, and the heating load.

In addition, a heating system forms a closed hot-water circuit comprising the high-temperature regenerator 10, the pipe 14, the separator 16, the pipe 15, and the high-temerpature regenerator 10.

The solution heated by the high-temperature regenerator 10 enters the separator 16 via the pipe 14. At this stage, the high-temperature solution is subjected to heat exchange with water flowing through the hot-water heat exchanger 60 so as to assume a low temperature, and is then returned to the high-temperature regenerator 10 via the pipe 15. The hot water which flows through the hot-water circuit flows through the hot-water heat exchanger 60 inside the separator 16 and is turned into hot water by absorbing the heat of the vapor and the like inside the separator 16 so as to be supplied for a heating load.

Figure 1:
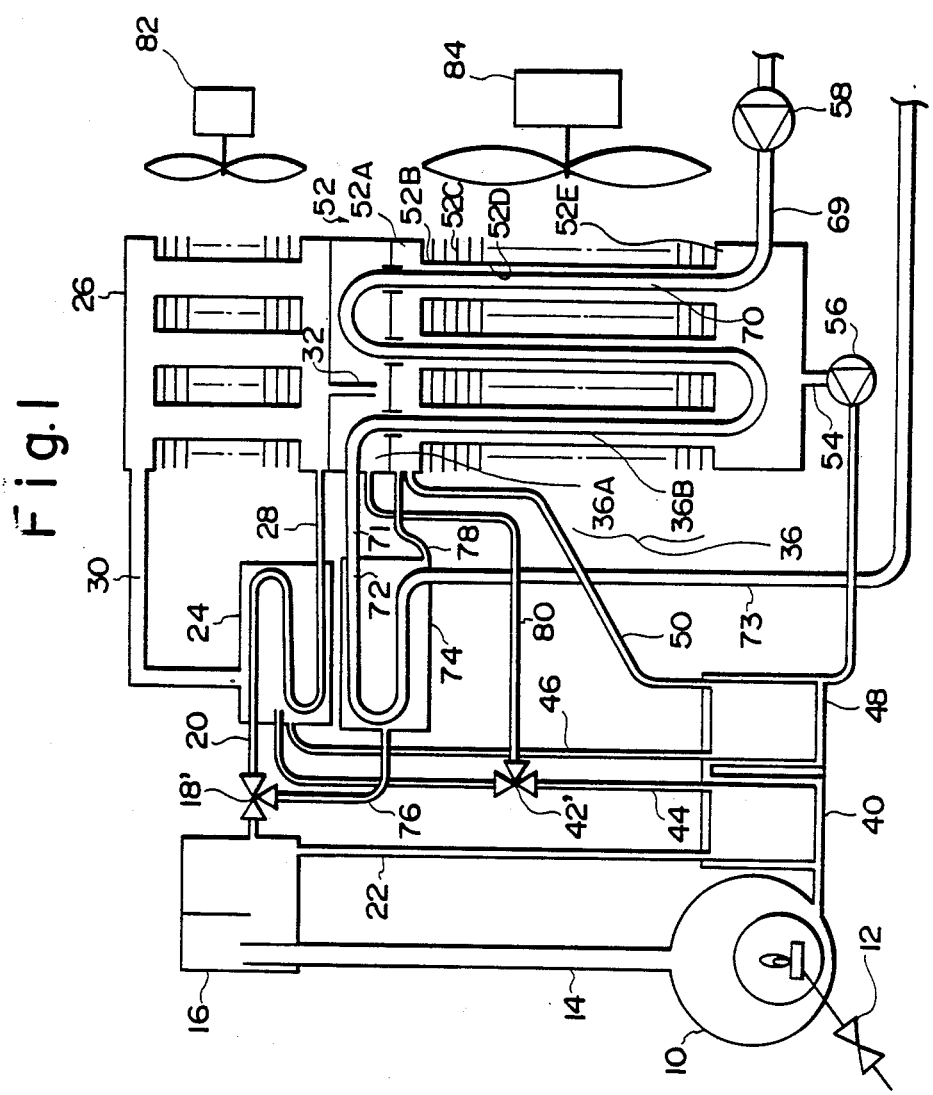
FIG. 1 is a diagram schematically illustrating an embodiment of an air-cooled absorption-type water cooling and heating apparatus in accordance with the present invention.

FIG. 1 is a diagram schematically illustrating a first embodiment of an air-cooled absorption-type water cooling and heating apparatus in accordance with the present invention. The same components that are similar to those of FIG. 3 are denoted by the same reference numerals, and a description thereof will be omitted.

The embodiment shown in FIG. 1 differs from the air-cooled absorption-type cold and hot water machine in the following points: The hot-water heat exchanger 60 is eliminated in the separator 16. One end of a first cold/hot water heat exchanger 70 provided instead of the cold-water heat exchanger 38 is connected to the delivery side of the cold/hot water heat exchanger pump 58 via a pipe 69. The other end of the first cold/hot water heat exchanger 70 is connected to a second cold/hot water heat exchanger 72 via a line 71. The other end of the second cold/hot water heat exchanger 72 is connected to a heating load (not shown) via a pipe 73. In addition, a three-way valve 18', which is a first change-over means, is provided in the pipe 20, the other connecting port of the three-way valve 18' being connected to a water heating device 74 in which the second cold/hot water heat exchanger 72 is provided. The water heating device 74 is connected to the second spraying mechanism 52A via a pipe 78. Furthermore, a three-way valve 42' is provided in a pipe 44, the other connecting port of the three-way valve 42' being connected to the first spraying mechanism 36A via a pipe 80. In addition, a first air-cooling fan 82 for air-cooling the air-cooled condenser 26 and a second air-cooling fan 84 for blowing cooling air to the fins 52C are provided. The other arrangements shown in FIG. 1 are the same as those in FIG. 3.

Incidentally, in this embodiment, the cylinder 52 B is formed concentrically around the outer periphery of the first cold/hot water heat exchanger 70 with a fixed interval therebetween, the fins 52C are provided around the outer periphery of the cylinder 52B, and the solution tank 52E is provided at the bottom portion of the cylinder 52B. During cooling, the outer wall surface of the first cold/hot water heat exchanger 70 serves as the evaporator (36B), while the inner wall surface of the cylinder serves as the absorber (52D). During heating, the outer wall surface of the first cold/hot water heat exchanger 70 serves as the absorber (36B), while the inner wall surface of the cylinder serves as the evaporator (52D).

The operation of the above-described embodiment will now be described.

<Cooling Operation>

During a cooling operation, the three-way valves 18', 42' are respectively changed over to the low-temperature regenerator 24 side, and the air-cooling fans 82, 84 are also operated.

The dilute solution in the high-temperature regenerator 10 is heated by the heating source 12, thereby assumes a high-temperature state, passes through the line 14, and then enters the separator 16.

The separator 16 separates the high-temperature dilute solution into refrigerant vapor and an intermediate-concentration solution, sends the refrigerant vapor to the low-temperature regenerator 24 via the three-way valve 18' and the vapor pipe 20, and sends the intermediate-concentration solution to the high-temperature heat exchanger 40 via the solution feeding pipe 22. The intermediate-concentration solution which has entered the high-temperature heat exchanger 40 undergoes heat exchange with the dilute solution sent to the high-temperature regenerator 10 so as to warm the dilute solution, and then enters the low-temeprature regenerator 24 through the three-way valve 42' and the outlet-side pipe 44.

The refrigerant vapor which has entered the low-temperature regenerator 24 after passing through the vapor pipe 20 heats the intermediate-concentration solution sent from the high-temperature heat exchanger 40, and is then led to the air-cooled condenser 26 through the outlet-side pipe 28. In addition, the intermediate-concentration solution in the low-temperture regenerator 24 is heated and is thereby converted into a condensed solution and refrigerant vapor. The refrigerant vapor is led to the air-cooled condenser 26 through the vapor pipe 30, while the condensed solution is led to the low-temperature heat exchanger 48.

The refrigerant vapor which has entered the air-cooled condenser 26 is forcedly air-cooled by the first air-cooling fan 82 and is thereby turned into a liquid refrigerant, which is then supplied to the inside of the low-pressure first spraying mechanism 36A through the pipe 32. The liquid refrigerant, which has been sprayed by the first spraying mechanism 36A onto the outer wall surface 36B of the first cold/hot water heat exchanger 70 serving as the evaporator, evaporates while cooling the cooling water discharged from the cold/hot water pump 58 and flowing through the first cold/hot water heat exchanger 70. This vapor is absorbed by the condensed solution sprayed by the second spraying mechanism 52A onto the inner wall surface 42D of the cylinder 52B which is air-cooled by the air-cooling fan 84. The cooled cooling water flows into a heating load (not shown) via the pipes 71, 73 and effects cooling. The cooling water is then absorbed by the cold/hot water pump 58 and repeats circulation.

Meanwhile, the condensed solution is led from the low-temperature regenerator 24 to the low-temperature heat exchanger 48, where the condensed solution is subjected to heat exchange with the dilute solution pressure-fed to the low-temperature heat exchanger 48 by the circulation pump 56 so as to be cooled. The cooled condensed solution is then supplied to the second spraying mechanism 52A. The condensed solution which has been sprayed onto the inner peripheral surface 52D of the cylinder 52B is cooled by the air-cooling fan 84, and, at the same time, absorbs the refrigerant vapor flowing in from the evaporator (36B) so as to be turned into a dilute solution, which remains in the solution tank 52E. This dilute solution is sucked by the circulation pump 56 via the return pipe 54, and is sent again to the high-temperature regenerator 10 via the low-temperature heat exchanger 48 and the high-temperature heat exchanger 40.

<Heating Operation>

At the time of a heating operation, the pipe 76 side of the three-way valve 18' is opened, and the low-temperature regenerator 24 side is closed. As for the three-way valve 42', the pipe 80 side thereof is opened, while the low-temperature regenerator 24 side thereof is closed. At the same time, the first air-cooling fan 82 is stopped, and only the second air-cooling fan 84 is operated.

The dilute solution in the high-temperature regenerator 10 is heated by the heating source 12, thereby assumes a high-temperature state, and enters the separator 16 through the pipe 14. The separator 16 seaprates the high-temeprature dilute solution into refrigerant vapor and a condensed solution. The separator 16 then sends the refrigerant vapor into the water heating device 74 via the three way valve 18' and the pipe 76, and sends the condensed solution to the heat exchanger 40 via the solution feeding pipe 22.

The refrigerant vapor which has entered the water heating device 74 is condensed and turned into a liquid refrigerant, while heating the heating water flowing through the second cold/hot water heat exchanger 72. This liquid refrigerant is supplied to the second spraying mechanism 52A via the pipe 78. When the liquid refrigerant, which has been sprayed onto the inner wall surface 52D of the cylinder 52B by this second spraying mechanism 52A, is cooled by the cooling fan 84, the liquid refrigerant evaporates by absorbing the heat thereof, and is absorbed by the condensed solution which has been sprayed onto the outer wall surface 36B of the first hot/cold water heat exchanger 70.

Meanwhile, the condensed solution which has been separated by the separator 16 is led to the high-temperature heat exchanger 40 via the solution feeding pipe 22, and is cooled by being subjected by this high-temperature heat exchanger 40 to heat exchange with the dilute solution sent from the circulation pump 56. The cooled condensed solution is then supplied to the first spraying mechanism 36A via the pipe 44, the three-way valve 42', and the pipe 80. The condensed solution is sprayed onto the outer wall surface 36B of the first cold/hot water heat exchanger 70 by the first spraying mechanism 36A. In the case of the heating operation, since the outer wall surfce 36B of the first cold/hot water heat exchanger 70 serves as the absorber, the absorption heat generated when the condensed solution absorbes the refrigerant vapor is given to the heating water flowing through the first cold/hot water heat exchanger 70, so as to prevent the temperature of the inside of the absorber from becoming high.

In short, this embodiment is arranged such that, during a heating operation, the absorption heat generated when the condensed solution absorbs the refrigerant vapor is imparted to the circulated cold or hot water flowing through the first cold/hot water heat exchanger 70 so as to convert said water into hot water, and condensation heat necessary for condensation of the refrigerant vapor by the water heating device 74 is supplied to the circulated cold or hot water flowing through the second cold/hot water heat exchanger 72 so as to convert said water into hot water for heating. At this time, since the refrigerant solution evaporates on the inner wall surface 52D of the cylinder 52B by absorbing the heat of the air, the heat obtained from the air is added to the heat obtained from the high-temperature regenerator 10, with the result that a heat pump effect can be obtained. A coefficient of the performance of a heating operation at tis time can be expressed as follows:

Coefficient of heat-pump performance

= coefficient of single-purpose refrigeration performance + heating efficiency of high-temperature regenerator = 0.5 to 0.6 + 0.8 to 0.85

= 1.3 to 1.45

Figure 2:
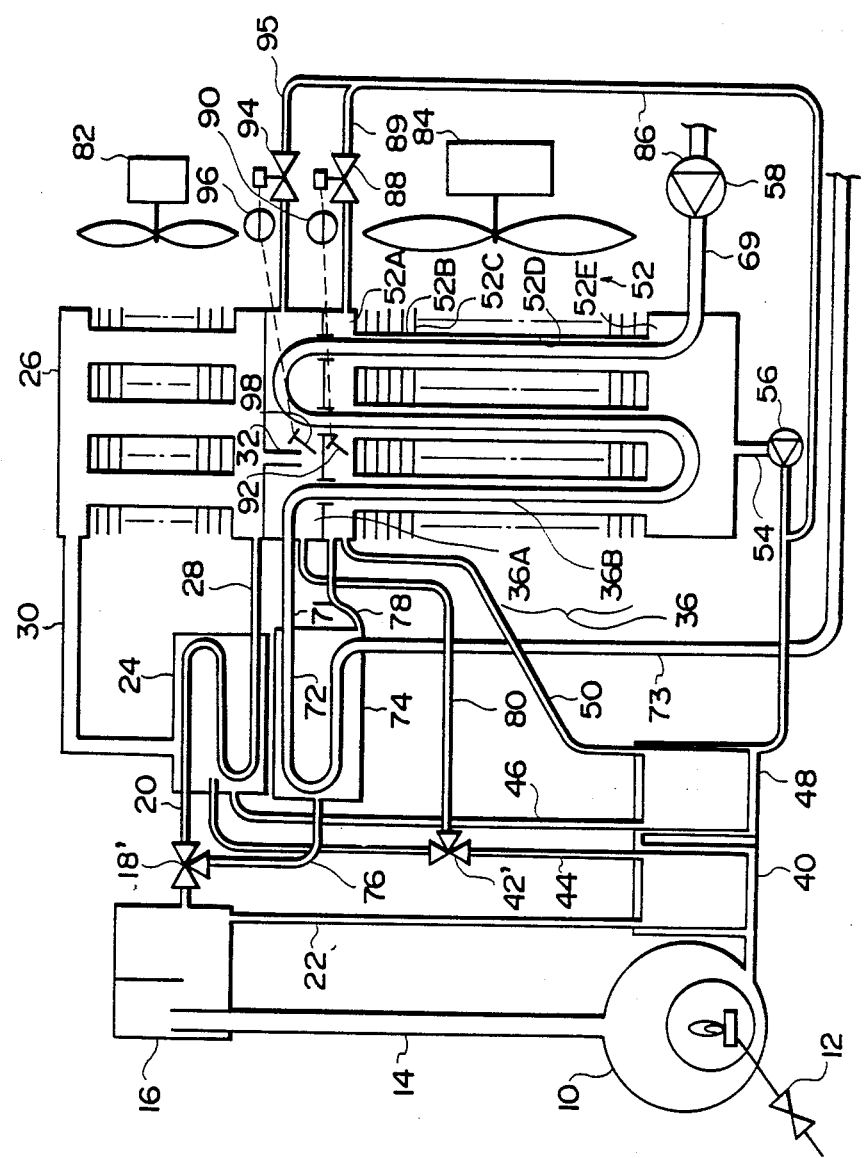
FIG. 2 is a diagram schematically illustrating an other embodiment in accordance with the present invention.

FIG. 2 is a diagram schematically illustrating a second embodiment of the present invention The second embodiment shown in FIG. 2 differs from the first embodiment shown in FIG. 1 in the following points: The delivery side of the circulation pump 56 is connected to a pipe 86, an end portion of tee pipe 86 being branched into a pipe 89 having an electromagnetic valve 88 and a pipe 95 having an electromagnetic valve 94. The pipe 89 is connected to the second spraying mechanism 52A, while the pipe 95 is connected to the first spraying mechanism 36A. The opening and closing of the electromagnetic valve 88 is controlled by a control signal from an adjustment meter 90, while the opening and closing of the electromagnetic valve 94 is controlled by a control signal from an adjustment meter 96. A detecting end 92 of the adjustment meter 90 is disposed in the second spraying mechanism 52A, while a detecting end 98 of the adjustment meter 96 is disposed in the first spraying mechanism. The other arrangments are identical to those shown in FIG. 1. Accordingly, those components of the embodiment shown in FIG. 2 that are similar to those of FIG. 1 are denoted by the same reference numerals, and a detailed description thereof will be omitted.

The operation of the second embodiment will now be described.

During a cooling operation, the conditions of the three-way valves 18', 44' and the air-cooling fans 82, 84 are the same as those during a cooling operation in the first embodiment (FIG. 1).

During the cooling operation, the temperature of the liquid refrigerant in the first spraying mechanism 36A (serving as the evaporator) is detected by the detecting end 92 of the adjustment meter 90, and the opening and closing the electromagnetic valve 94 is controlled by the adjustment meter 96 in such a manner that the temperature of the refrigerant will not drop below the freezing temperature (0° C.). The dilute solution is thus allowed to flow into the first spraying mechanism 36A in order to prevent the freezing of the refrigerant.

During a heating operation, the three-way valves 18', 44' and the air-cooling fans 82, 84 are set in the same conditions as those of the heating operation in the first embodiment (FIG. 1).

During the heating operation, the temperature of the liquid refrigerant in the second spraying mechanism 52A (serving as the evaporator) is detected, and the opening and closing of the electromagnetic solenoid valve is controlled by the adjustment meter 90 in such a manner that the temperature of the refrigerant will not drop below the freezing temperature (0° C.). The dilute solution is thus allowed to flow into the second spraying mechanism, thereby preventing the freezing of the refrigerant and the frosting on the outer periphery of the cylinder 52B.

In accordance with the above-described embodiments, the following advantages can be obtained:

(1) Since this machine functions as a single-purpose absorption heat pump using an air heat source, which pumps heat fom the air during a heating operation, the thermal efficiency for heating becomes 1.3 to 1.45, which is about 1.7 times greater than the conventional level. Hence, the running cost can be reduced substantially.

(2) The heating capabilitity is about 1.7 times greater than the conventional level, which is about 1.3 times greater than the cooling capability, it is unnecessary to to provide auxiliary burning for increasing the heating capability or increase the quantity of heat during a heating operation, so that the construction of the apparatus can be made simple.

(3) An air-cooled ahir heat source-absorption water cooling and heating apparatus can be obtained by a simple improvement of a conventional air-cooled dual-purpose absorption refrigerating machine.

As has been described above, in accordance with the present invention, there is an advantage in that the coefficient of performance can be improved during both cooling and heating operations.

What is claimed is:

1. An air-cooled absorption-type water cooling and heating apparatus, comprising:
   a high-temperature regenerator having a heating source for heating a dilute solution;
   a separator for separating said dilute solution heated by said high-temperature regenerator into refrigerant vapor and an intermediate-concentration solution;
   a high-temperature heat exchanger for subjecting said intermediate-concentration solution to heat exchange with said dilute solution flowing into said high-temperature exchanger;
   first change-over means adapted to introduce said refrigerant vapor introduced from said separator into a low-temperature regenerator during cooling and into a water heating device during heating;
   second change-over means adapted to introduce said intermediate-concentration solution from said high-temperature heat exchanger into said low-temperature regenerator to generate a condensed solution during cooling and into a first spraying mechanism during heating;
   a condenser for condensing said refrigerant vapor from said low-temperature regenerator into a liquid refrigerant during cooling so as to be supplied to said first spraying mechanism;
   a low-temperature heat exchanger by which a condensed solution flowing in from said low-temperature regenerator is subjected to heat exchange with said dilute solution entering said high-temperature heat exchanger so as to be cooled;
   a second spraying mechanism which receives the supply of said condensed solution from said low-temperature heat exchanger during cooling and receives the supply of said liquid refrigerant from said water heating device during heating;
   a first cold/hot water heat exchanger through which cold or hot water is allowed to flow, externally surrounding means being disposed around an outer periphery of said first cold/hot water heat exchanger with a fixed interval therebetween; and
   a second cold/hot water heat exchanger through which said cold or hot water is allowed to flow,
   wherein said first spraying mechanism is adapted to spray said condensed solution or said liquid refrigerant onto an outer surface of said first cold/hot water heat exchanger, said second spraying means is adapted to be capable of spraying said condensed solution or said liquid refrigerant onto an inner surface of said externally surrounding means so as to obtain a dilute solution, an outer surface of said externally surrounding means is capable of being air-cooled, and a circulation pump is provided to pressure-feed said dilute solution to said low-temperature heat exchanger.

2. An air-cooled absorption-type water cooling and heating apparatus according to claim 1, wherein said cold or hot water flows to said second cold/hot water heat exchanger via said first cold/hot water heat exchanger.

3. An air-cooled absorption-type water cooling and heating apparatus according to claim 1, further comprising an air-cooling fan for said condenser and an air-cooling fan for cooling said outer surface of said externally surrounding means of said first cold/hot water heat exchanger.

4. An air-cooled absorption-type water cooling and heating apparatus, comprising:
   a high-temperature regenerator having a heating source for heating a dilute solution;
   a separator for separating said dilute solution heated by said high-temperature regenerator into refrigerant vapor and an intermediate-concentration solution;

a high-temperature heat exchanger for subjecting said intermediate-concentration solution to heat exchange with said dilute solution flowing into said high-temperature exchanger;

first change-over means adapted to introduce said refrigerant vapor introduced from said separator into a low-temperature regenerator during cooling and into a water heating device during heating;

second change-over mean adapted to introduce said intermediate-concentration solution from said high-temperature heat exchanger into said low-temperature regenerator to generate a condensed solution during cooling and into a first spraying mechanism during heating;

a condenser for condensing said refrigerant vapor from said low-temperature regenerator into a liquid refrigerant during cooling so as to be supplied to said first spraying mechanism;

a low-temperature heat exchanger by which a condensed solution flowing in from said low-temperature regenerator is subjected to heat exchange with said dilute solution entering said high-temperature heat exchanger so as to be cooled;

a second spraying mechanism which receives the supply of said condensed solution from said low-temperature heat exchanger during cooling and receives the supply of said liquid refrigerant from said water heating device during heating;

a first cold/hot water heat exchanger through which cold or hot water is allowed to flow, externally surrounding means being disposed around an outer periphery of said first cold/hot water heat exchanger with a fixed interval therebetween; and a second cold/hot water heat exchanger through which said cold or hot water is allowed to flow, wherein said first spraying mechanism is adapted to spray said condensed solution or said liquid refrigerant onto an outer surface of said first cold/hot water heat exchanger, said second spraying means is adapted to be capable of spraying said condensed solution or said liquid refrigerant onto an inner surface of said externally surrounding means so as to obtain a dilute solution, an outer surface of said externally surrounding means is capable of being air-cooled, and a circulation pump is provided to pressure-feed said dilute solution to said low-temperature heat exchanger, whereby the temperature of said first spraying mechanism is detected during cooling and the temperature of said second spraying mechanism is detected during heating, and when a predetermined temperature is reached, said dilute solution can be introduced from the delivery side of said circulation pump into said first spraying mechanism or said second spraying mechanism.

5. An air-cooled absorption-type water cooling and heating apparatus according to claim 4, wherein the temperature of said spraying mechanism to be detected is the temperature of said liquid refrigerant in said spraying mechanism.

6. An air-cooled absorption-type water cooling and heating apparatus according to claim 4 or 5, wherein the introduction of said dilute solution into said spraying mechanism is controlled by an electromagnetic solenoid valve provided in a pipe connecting said circulation pump and said spraying mechanism.

* * * * *